Figure 1:
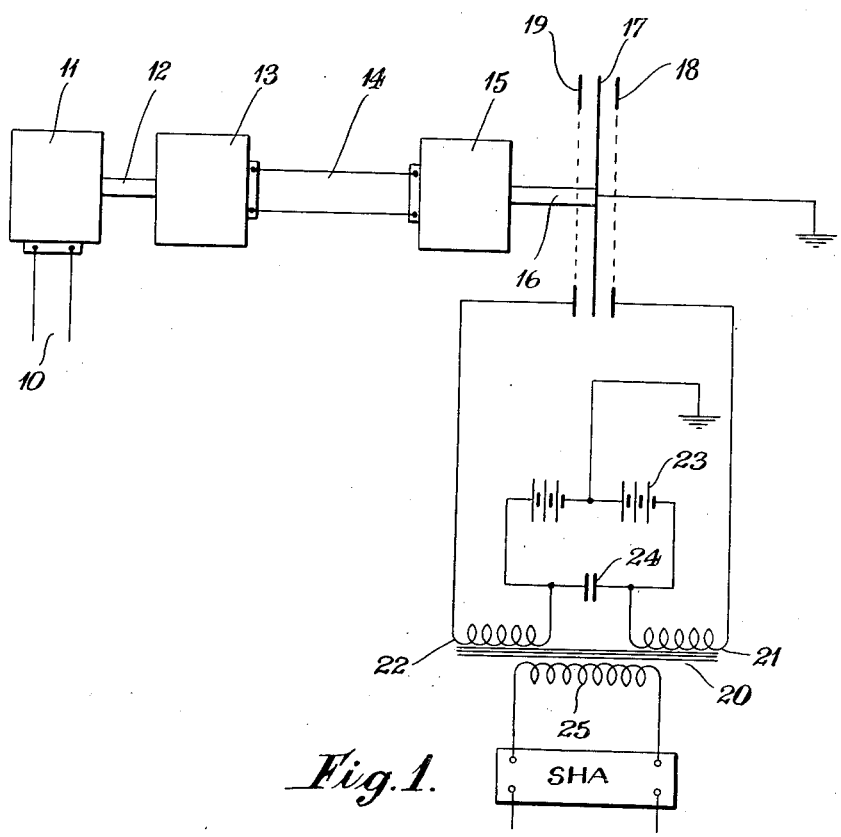

April 15, 1941.  G. WIKKENHAUSER ET AL  2,238,089
ELECTRICAL SIGNAL GENERATOR
Filed Feb. 5, 1938  3 Sheets-Sheet 1

Inventors
Gustav Wikkenhauser &
Amherst F. H. Thomson

By Cushman, Darby, & Cushman
Attorneys

April 15, 1941. G. WIKKENHAUSER ET AL 2,238,089
ELECTRICAL SIGNAL GENERATOR
Filed Feb. 5, 1938 3 Sheets-Sheet 2

Inventors
Gustav Wikkenhauser +
Amherst F.H. Thomson
By Cushman, Darby, Cushman
Attorneys Patented Apr. 15, 1941

2,238,089

UNITED STATES PATENT OFFICE 2,238,089

ELECTRICAL SIGNAL GENERATOR

Gustav Wikkenhauser and Amherst Felix Home Thomson, Kensington, London, England

Application February 5, 1938, Serial No. 188,994
In Great Britain February 12, 1937

3 Claims. (Cl. 175—363)

The present invention relates to apparatus for generating an electrical oscillation of substantially pure sine-wave form and of substantially constant frequency.

Such an oscillation is required for many electrical operations. For example, in a television transmission of the kind comprising picture signals interspersed with periodically recurring synchronising signals, it is highly desirable that these signals should occur at an exactly regular frequency, in order that the transmission shall be receivable by a receiver employing mechanical scanning. Hitherto such signals have been generated by electronic means from the frequency of the alternating current supply mains. The frequency of these mains is however liable to be disturbed by the switching on and off of heavy loads, with the result that a mechanical television receiver, receiving a transmission where the synchronising signals are generated directly from the supply mains, will fall out of synchronism owing to its inability to follow the sudden change in the frequency or phase of the synchronising signals resulting from the surge in the mains supply. If the synchronising signals are generated from a pure sine wave of substantially constant frequency, the above difficulties met in operating mechanical television receivers are removed. This is but one example of where a generator of a substantially pure sine-wave oscillation can be used to great advantage.

It is an object of the present invention to provide a generator of an electrical oscillation of substantially pure sine-wave form from a source of direct current, using rotating parts driven by a synchronous electric motor, the driving power from which is derived from or obtained from the A. C. supply mains.

In accordance with the invention, a toothed rotor is rotated at a substantially constant speed between two toothed stators by means connected to an alternating current mains supply. The rotor and the two stators all have an equal number of teeth. The toothed stators are connected to opposite ends of a source of potential, and the rotor is held at a potential mid-way between the potentials of the stators. The current developed in the circuit connecting said stators is of substantially pure sine wave form and is fed to a suitable output circuit.

In order to render clearer the nature of the invention, a preferred embodiment will now be described by way of example with reference to the production for a television transmitter of line synchronising impulses having a frequency of 10,125 cycles per second from an alternating current mains supply of 50 cycles per second frequency.

Figure 2:
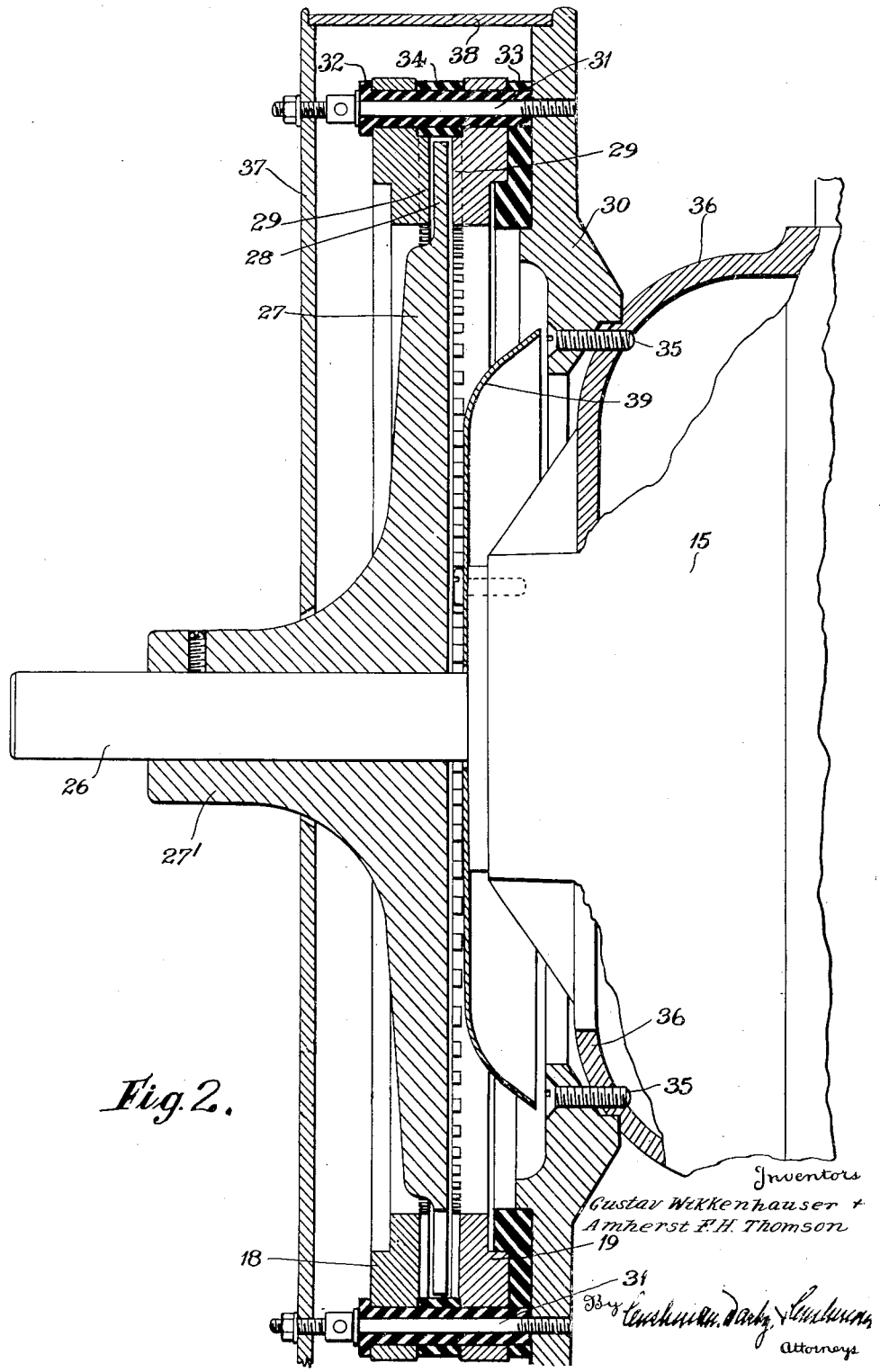
Figure 3:
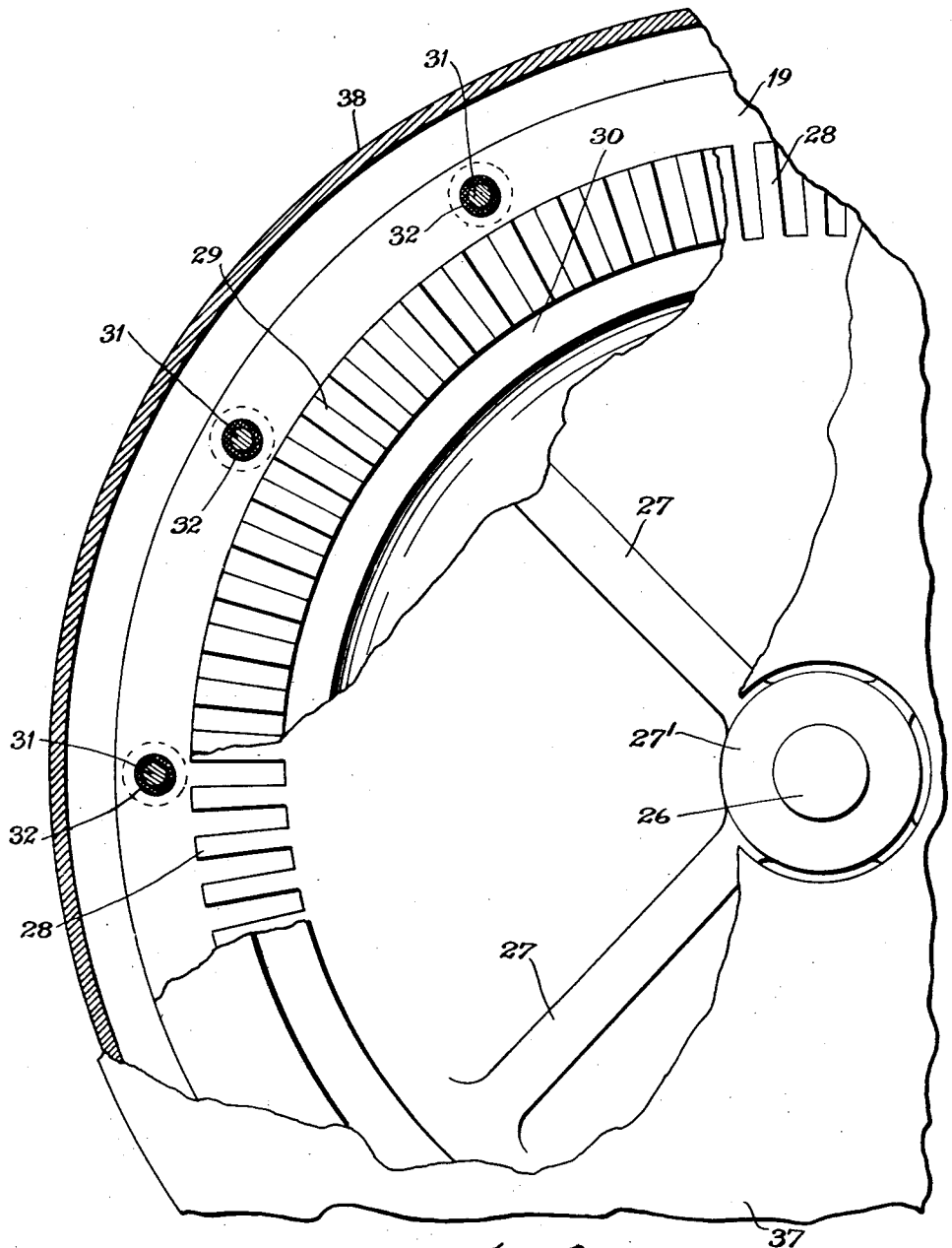

In the drawings illustrating these embodiments,

Fig. 1 shows diagrammatically the general assembly of the apparatus including a circuit diagram of the electrical connections, Fig. 2 shows a side-section of the signal generator, and Fig. 3 shows an end sectional elevation of parts of Fig. 2.

Referring now to Fig. 1 of the drawings, the 50 cycle mains supply is fed by suitable leads to a two-pole synchronous motor 11, which rotates at a speed of 50 revolutions per second. The shaft 12 of the motor 11 is directly coupled to the rotor of a generator 13, generating a current having a frequency of 250 cycles per second. The output of generator 13 is connected by leads 14 to a four-pole synchronous motor 15 which rotates at a speed of 125 revolutions per second. Secured to the shaft 16 of the motor 15 is the rotor 17 of a rotating condenser, this rotor 17 being in the form a brass disc with 81 teeth round its periphery. The rotor 17 co-operates with two stators 18 and 19, each in the form of a brass annular ring parallel to the rotor 17, one on each side of it, and each having 81 teeth. The details of the construction of the rotor 17 and stators 18 and 19 will be described fully hereinafter with reference to Figs. 2 and 3.

The rotor disc is earthed. A transformer 20 has two equal primary windings 21 and 22. One end of winding 21 is connected to the stator 18 and the opposite end of winding 22 to stator 19. The other ends of the windings 21 and 22 are connected respectively to opposite terminals of a source of voltage represented by the battery 23, the electrical centre of which is earthed (i. e. connected to the rotor 7). Preferably a condenser 24 is connected across the source of voltage 23. The output of the arrangement is taken from the secondary winding 25 of the transformer 20, and is fed to a shaping circuit SHA, which transforms the sine-wave output of the transformer 20 into the square topped pulses required for television synchronising.

Figs. 2 and 3 show in detail the structure and mounting of the stators 18 and 19 and the rotor 17.

The rotor 17 of Fig. 1 is fixed to the shaft 26 (Figs. 2 and 3) of the motor 15 only the end of which is shown in Fig. 2; the rotor comprises a disc 27 shown broken in Fig. 3, and attached to the shaft 26 by the hub 27¹. Ridges 29 are provided to make the disc rigid. The outer edge of the disc 27 is cut into teeth 28, of which there are 81. The stators 18 and 19 are in the form of rings provided with teeth 29 and are secured to a stator frame 30 by means of bolts 31. Each bolt 31 is covered by an insulating sleeve 32; an insulating ring 33 insulates the stator 19 from the stator frame 30, and an insulating spacer 34 on the sleeve 32 insulates the stators 18 and 19 from each other. The stator frame is attached by screws 35 to the part 36 of the motor frame. A cover plate 37 and cover ring 38 serve to enclose the rotor and stators, and a magnetic shield 39 serves to prevent the arrangement from being disturbed in operation by the magnetic fields of the motor 15. The whole arrangement, including the motor, is encased in an air tight casing (not shown) which is evacuated to reduce friction in running. The generation of the output signal is due to the fact that when the rotor teeth are between the teeth of the stators, the capacity between the latter is increased, since their electrical distance has been reduced by inserting between them a conductor having a potential lying between the potentials of the two stators. The voltage produced by this arrangement has a substantially pure sinus form and has a frequency of 125×81=10,125 cycles per second. After suitable amplification this fluctuating voltage is applied to a time base circuit in known manner to produce the line synchronising impulses of the desired shape.

This arrangement has the advantage over the known arrangement for generating synchronising signals usually referred to as the light siren in that every stator tooth co-operates with a rotor tooth at the same moment, so that errors due to inevitable slight differences in the size or spacing of the teeth and to eccentric mounting of the rotor on its shaft are reduced to a minimum, for each cycle of the output wave form will have the same shape. In the case of the light siren where the holes in the disc operate successively, unevenness in the spacing and size of the holes and eccentric mounting of the disc will produce variations in frequency and amplitude of the generated oscillation, which variations have to be compensated for by suitable electrical circuits.

The embodiment of the invention shown in the drawings in which two stators are used has a further advantage that errors in mounting the rotor perpendicular to its shaft do not affect the output, since it is immaterial whether the teeth of the rotor lie exactly mid-way between the stator teeth or not.

It is not essential that the rotor be driven by the motor-generator-motor frequency multiplier system 11, 12, 13, 15 of Fig. 1. The rotor may be driven by a synchronous motor connected directly to the supply mains. The arrangement described above is preferred, however, since in this a greater amount of smoothing of unwanted fluctuations in the mains frequency can be obtained. One mechanical synchronous drive having inertia can only be made to smooth out a certain percentage of the fluctuations, and if the inertia is increased beyond a certain limit the motor will fall out of synchronism. The drive with only one synchronous motor may however be used in cases where it is known that undesirable fluctuations in the A. C. supply are only small.

We claim:
1. An electric generator for generating an electric oscillation of substantially sine-wave form and of substantially constant frequency, said generator comprising two similar toothed stators, each stator having all its teeth electrically connected together and one stator being placed so that the teeth thereof are opposite those of the other stator, a toothed rotor having a number of teeth electrically connected together and equal in number to those on said stators, means adapted to be connected to an alternating current supply mains for rotating said rotor at a substantially constant speed, means for applying a potential difference between said stators, means for holding said rotor at a potential substantially mid-way between the potentials on said stators, an output circuit, and electrical means for feeding the alternating potential generated across said stators during rotation of said rotor to said output circuit.

2. An electric generator for generating an electric oscillation of substantially sine-wave form and of substantially constant frequency, said generator comprising two similar toothed stators, each stator having all its teeth electrically connected together and one stator being placed so that the teeth thereof are opposite those of the other stator, a toothed rotor having a number of teeth electrically connected together and equal in number to those on said stators, means adapted to be connected to an alternating current supply mains for rotating said rotor at a substantially constant speed, means for applying a potential difference between said stators, means for holding said rotor at a potential substantially mid-way between the potentials on said stators, an output circuit, and electrical means comprising a transformer having a secondary winding and two primary windings, one end of each of said primary windings being connected to one of said stators and the other end of each being connected to one terminal of said means for applying a potential difference to said stators, said secondary winding being connected to said output circuit.

3. An electric generator for generating an electric oscillator of substantially sine-wave form and of substantially constant frequency, said generator comprising two similar toothed stators, each stator having all its teeth electrically connected together and one stator being placed so that the teeth thereof are opposite those of the other stator, a toothed rotor having a number of teeth electrically connected together and equal in number to those on said stators, an electric synchronous motor drivably connected to said rotor, a second electric synchronous motor adapted to be connected to and driven by an alternating current supply mains, a generator drivably connected to said second synchronous motor and being adapted to produce an alternating current having a frequency which is a multiple of the rotational frequency of said second synchronous motor, electrical connections between said generator and said first synchronous motor, means for applying a potential difference between said stators, means for holding said rotor at a potential substantially mid-way between the potentials on said stators, an output circuit, and electrical means for feeding the alternating potential generated across said stators during rotation of said rotor to said output circuit.

GUSTAV WIKKENHAUSER.
AMHERST FELIX HOME THOMSON.